June 12, 1928.
M. W. McCONKEY
1,673,417
REENFORCED BRAKE SHOE
Filed Feb. 16, 1927
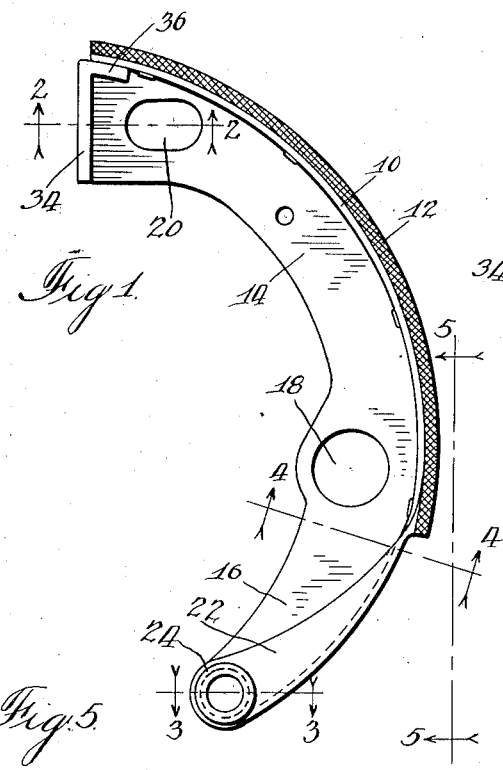
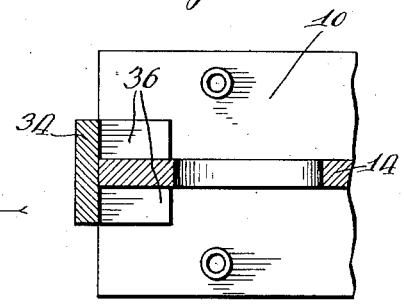
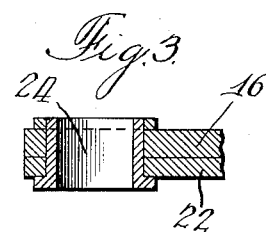
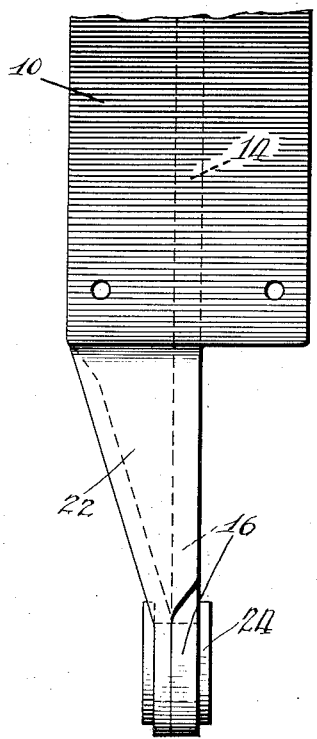
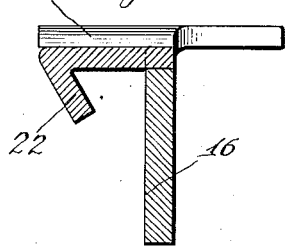
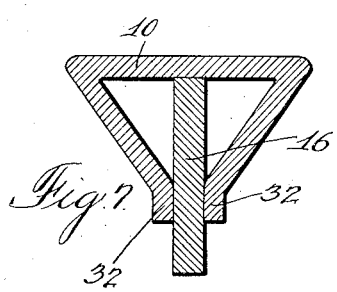
Inventor.
Montgomery W. McConkey Patented June 12, 1928.

1,673,417

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

REENFORCED BRAKE SHOE.

Application filed February 16, 1927. Serial No. 168,508.

This invention relates to brake shoes, and is illustrated as embodied in a shoe for an internal expanding automobile brake.

An important object of the invention is to reenforce the pivot arm formed at the end of the shoe, preferably by extending the stiffening web (shown as a separate member welded to an arcuate outer part), by deflecting the outer part of the shoe at that end into engagement with one or both sides of the pivot arm. A pivot bushing may be inserted through the arm and reenforcement where they are thus superposed at the end of the shoe.

Other features of the invention relate to a novel cam thrust plate arranged to form a kind of truss at the end of the shoe, and to other novel and desirable details of construction which will be apparent from the following description of several illustrative embodiments shown in the accompanying drawing, in which:

Figure 1 is a side elevation of the shoe;

Figure 2 is a partial section through one end of the shoe, on the line 2—2 of Figure 1;

Figure 3 is a partial section through the opposite end of the shoe, on the line 3—3 of Figure 1;

Figure 4 is a cross-section through the shoe, on the line 4—4 of Figure 1;

Figure 5 is a partial outside elevation of the shoe, before the lining is attached, looking in the direction of the arrows 5—5 in Figure 1; and Figures 6 and 7 are views corresponding to Figure 4, but showing modified forms of shoes.

In the arrangement of Figures 1–5, the shoe is built up of two principal parts, one of which is a generally cylindrical outer part or band 10, to which the lining 12 is riveted or otherwise secured, and the other of which is a substantially flat separate stiffening member or web 14 welded or otherwise secured to the inner face of band or outer part 10, and which is extended at the lower end of the shoe as an integral arm 16.

Web 14 may be formed with an opening 18 for the anchor of an adjacent shoe, and with an opening 20 for a post forming part of a shoe-positioning device, as explained in Paten No. 1,604,394, granted Bendix Brake Company on October 26, 1926, on application of A. Y. Dodge.

An important feature of the present invention relates to reenforcing the arm 16, which is subject to a heavy buckling or crushing strain when the brake is applied, by continuing a portion 22 of the outer part or band 10 as an integral extension which is deflected into engagement with the side of arm 16. I prefer to insert a pivot bushing 24 through the superposed portions of arm 16 and extension 22, at the end of the shoe.

As shown in Figure 6, an extension 26 (corresponding to extension 22) may be made wide enough to engage the side of arm 16 throughout its length, and may be flanged at 28 to interlock with an offset 30 on arm 16. Or, as shown in Figure 7, both sides of the outer part 10 may be provided with extensions 32 engaging the opposite sides of arm 16.

At the end opposite arm 16, the shoe is provided with a cam thrust plate 34 engaging (and welded to) the end of web 14, and having tongues 36 on opposite sides of web 14 and welded to the inner face of the outer part or band 10, which may be regarded as forming flanges extending on opposite sides of web 14.

While three illustrative embodiments have been described in detail, it is not my intention to limit the scope of the invention to those particular embodiments, or otherwise than by the terms of the appended claims.

I claim:

1. A brake shoe comprising an arcuate part and a separate stiffening member secured to said arcuate part and extended at one end to form an integral arm, the arcuate part being extended at said end and deflected into engagement with the side of said arm to reenforce it.

2. A brake shoe comprising an arcuate part and a separate stiffening member secured to said arcuate part, the arcuate part being deflected into engagement with the side of said stiffening member to reenforce it.

3. An arc-shaped brake-shoe generally T-shaped in cross-section, and having a stiffening web extended at one end of the shoe to form an integral arm, the shoe being provided with a cylindrical part which at said end of the shoe is deflected into engagement with the side of said arm to reenforce it.

4. An arc-shaped brake-shoe generally T-shaped in cross-section, and having a stiffening web extended at one end of the shoe to form an integral arm, the shoe being provided with a cylindrical part which at said end of the shoe is deflected into engagement with both sides of said arm to reenforce it.

5. A brake shoe comprising a stiffening web extended at one end of the shoe as an integral arm, together with an arcuate outer part stiffened by said web and deflected at said end of the shoe into engagement with the side of said arm to reenforce it, in combination with a pivot bushing at said end of the shoe passing through the arm and the reenforcing part of said outer part.

6. A brake shoe T-shaped in cross-section at least at one end, to provide a stiffening web and flanges on opposite sides of the web, in combination with a thrust plate engaging the end of said web and having tongues extending on opposite sides of the web and engaging the inner faces of said flanges.

In testimony whereof, I have hereunto signed my name.

MONTGOMERY W. McCONKEY.